United States Patent [19]

Gibbon

[11] 4,074,865

[45] Feb. 21, 1978

[54] METHOD OF RECOVERING PLATINUM GROUP METAL VALUES FROM A USED WASHCOATED CATALYST

[75] Inventor: Alan Gibbon, London, England

[73] Assignee: Johnson, Matthey & Co., Limited, London, England

[21] Appl. No.: 504,670

[22] Filed: Sept. 6, 1974

[30] Foreign Application Priority Data

Sept. 11, 1973 United Kingdom ............... 42680/73

[51] Int. Cl.$^2$ ........................ B07B 4/00; C01G 55/00; C22B 11/00; B02C 23/08
[52] U.S. Cl. .......................................... 241/24; 423/1; 423/22; 209/3; 209/133; 209/155; 75/.5 R
[58] Field of Search .............. 423/1, 22, 659; 241/24; 75/83, .5 R; 209/3

[56] References Cited

U.S. PATENT DOCUMENTS

| | | | |
|---|---|---|---|
| 1,331,904 | 2/1920 | Elder | 423/659 UX |
| 1,458,016 | 6/1923 | Wigton et al. | 75/83 X |
| 2,226,149 | 12/1940 | Zimmermann | 423/22 X |
| 2,805,941 | 9/1957 | Tucker | 423/22 X |
| 2,830,877 | 4/1958 | Appell | 423/22 |
| 2,863,760 | 12/1958 | Ashley et al. | 423/22 X |
| 2,906,465 | 9/1959 | Sweet | 241/24 |
| 2,920,953 | 1/1960 | Rudorfer | 423/22 |
| 3,469,971 | 9/1969 | Leopard | 423/22 |
| 3,525,606 | 8/1970 | Bodine | 423/1 |
| 3,951,648 | 4/1976 | Stern et al. | 423/22 |

FOREIGN PATENT DOCUMENTS

| | | | |
|---|---|---|---|
| 542,330 | 1/1942 | United Kingdom | 423/22 |
| 856,851 | 12/1960 | United Kingdom | 423/22 |

*Primary Examiner*—Edward Stern
*Attorney, Agent, or Firm*—Cushman, Darby & Cushman

[57] ABSTRACT

This invention relates to the recovery of metallic values from materials such as catalysts containing or supporting the values. The method comprises removing a layer or layers and a catalyst support including a quantity of the metallic value and thereafter chemically or otherwise separating the value therefrom.

6 Claims, No Drawings

METHOD OF RECOVERING PLATINUM GROUP METAL VALUES FROM A USED WASHCOATED CATALYST

This invention relates to the recovery of metallic values from materials, such as catalysts containing or supporting the values.

According to one aspect of the present invention a method of recovering a metallic value from a support impregnated or carrying a coating of the value comprises removing a layer or layers of the support including a quantity of the metallic value, and thereafter, chemically or otherwise, separating the metallic value from the support.

It is well known in catalysis to apply to a substrate a metallic value which constitutes the catalyst material. The metallic value may be a precious or platinum group metal and may be applied to a catalyst support in the form of a so-called "washcoat". In catalysis the quantity of metal used as the catalyst material (the metallic value) is, generally speaking, a relatively small proportion of the total weight of the catalyst. For example, catalysts intended primarily for use in the purification of vehicle exhaust gases contain metallic values as low as (0.1 - 0.4)% of the weight of the total catalyst, Chemical recovery of metallic values from supports bearing such relatively low quantities of the metallic values by, for example, acid leaching, would be very costly due to the size of the plant and to the quantities of reagents required. One "washcoat" method of laying down or applying a metallic value catalyst to a substrate involves applying to a cordierite support an alumina washcoat which is impregnated or subsequently coated with a platinum group metal or alloy, for example, platinum or rhodium or alloys thereof.

The use of the present invention to recover metallic values from a washcoated catalyst is particularly useful. To this end the washcoating and the metallic value is preferably removed from the support using, for example, wet gravity separation or dry air classification techniques and, consequently, the proportion of metallic value relative to the material so separated from the catalyst, is greater than the proportion of metallic value relative to the whole catalyst. Thus, during actual recovery, one is required to operate on a much smaller quantity of material containing a higher concentration of metallic value than would be the case if one operated upon the spent catalyst as a whole. Such a concentrate can be treated chemically or by differential gringing techniques.

A number of Examples of putting the present invention into practice will now be described.

EXAMPLE I

A sample (6 g) of used car exhaust catalyst containing nominally 0.35% Pt and 0.03% Rh was ground in a Tema mill until 50% was −400 mesh, (<36 μm). The material was treated on a Superpanner (wet gravity separator) manufactured by Infrasizers Ltd., Toronto, Canada. The concentrate obtained weighed 27.1% of the weight of the input material and the tails 72.9%. The concentrate assayed at 1.054% Pt and 0.044% Rh and the tails at 0.041% Pt, 0.002% Rh. Thus, 90% of the Pt and 89.1% of the Rh was recovered in the concentrate.

EXAMPLE II

A sample (30.2 g) of used car exhaust catalyst containing nominally 0.22% Pt + Rh was passed through a Glen Creston Laboratory Hammer Mill fitted with a 1 mm 16 mesh discharge screen. On the Superpanner a 12.5% concentrate was obtained containing 1.11% Pt, 0.082% Rh. The tails were ground for 20 seconds in a Tema mill and retreated on the Superpanner to give a second "concentrate" referred to here as the middling fraction (14.5%), containing 0.20% Pt, 0.013% Rh and a tails (73.0%) at 0.03 Pt, 0.002% Rh. Thus, 88.5% of the Pt and 89.3% of the Rh was recovered in the concentrate and middling which together represented 27% of the original bulk.

EXAMPLE III

A separation was carried out on a converted Bessemer Table (a wet gravity type separator) fitted with a flat, riffleless deck using a double grinding procedure similar to that used in (II). The input of used catalyst contained nominally 0.35% Pt + Rh. The concentrate (19.2%) contained 1.41% Pt + Rh, the middling (15.5%) contained 0.42% Pt + Rh and the tails (65.3%) contained 0.07% Pt + Rh. Thus, 88.0% of the Pt + Rh was recovered into the concentrate and middling which together were 34.7% of the original bulk.

EXAMPLE IV

2 Kg of unused catalyst containing nominally 0.130% Pt, 0.012% Rh were ground in a Tema mill so that ~47% was −400 mesh, and treated on a Bartles Mozley Vanner (wet gravity separator). A concentrate (20.8% at 0.393% Pt, 0.037% Rh), a middling (22.3% at 0.060% Pt, 0.005% Rh) and a tail fraction (56.9% at 0.038% Pt, 0.003% Rh) were obtained. Thus, 81.5% of the Pt and 83.8% of the Rh were recovered in the concentrate and middling fraction.

EXAMPLE V 500 g of unused catalyst (nominally 0.3% Pt, 0.001% Rh) ground so that 55% was −400 mesh was treated in an Alpine 100 MZR Multiplex Zig-Zag Air Classifier (dry air classifier) using a "cut point" of 10 μm. The concentrate (fines) was 19.8% at 1.51% Pt and the tails (coarse) was 80.2% at 0.033% Pt. The recovery in the concentrate was thus 92%.

EXAMPLE VI 500 g of unused catalyst containing nominally 0.13% Pt, 0.012% Rh groundd so that 47% was −400 mesh was treated as in (V) but using a "cut point" of 20 μm. The concentrate (37%) contained 0.252% Pt, 0.023% Rh. The tails (63%) contained 0.025% Pt, 0.002% Rh. The recovery into the concentrate was thus 85.5% for Pt and 87.1 for Rh.

EXAMPLE VII 400 g of used catalyst containing nominally 0.729% Pt ground so that 45% was −400 mesh was treated as in Example V. The concentrate (20%) contained approximately 3.3% Pt. The tails (80%) contained 0.105% Pt. The recovery into the concentrate was thus 88.7%.

EXAMPLE VIII

10 Kg of unused catalyst containing nominally 0.171% Pt and 0.017% Rh which had been ground to about 40% −400 mesh was treated in a "MSI" Air Classifier, manufactured by Hosokawa Europe Ltd., using a cut point of 10 μm. The concentrate (fines) was 32% at 0.44% Pt and 0.047% Rh. The tails (coarse) was 68% at 0.034% Pt and 0.002% Rh. The recovery was thus 85.9% for Pt and 91.7% for Rh.

EXAMPLE IX

3 Kg of the unused catalyst treated in Example VIII was wet screened at 413 mesh on a Russell vibrating screen. The concentrate or fines (37%) contained 0.38% Pt and 0.031% Rh. The tails or coarse (63%) contained 0.05% Pt and 0.009% Rh. The recovery into the concentrate was thus 81.7% for Pt and 66.9% for Rh.

In the above Examples separation is possible because of differential grinding of the washcoat and support in the catalyst.

Particle size analysis has been carried out on the air classifier products of a sample of catalyst which had been gound to 47% −400 mesh in the Tema mill and separated at 10 μm. The concentrate or fines contained some particles of less than 1 μm, but very few coarser than 10 μm. The tails or coarse contained very few particles less than 30 μm.

What we claim is:

1. A method of recovering platinum group metal values from a used washcoated catalyst comprising a catalyst support having a catalytic washcoat thereon including platinum group metal, said method comprising grinding the catalyst to obtain fines which are less than 10 μm and tails which are greater than 10 μm, at least 40-55% of the ground catalyst being −400 mesh and the fines containing most of the platinum group metal values, and separating the fines from the tails using a cut point of 10 μm.

2. A method according to claim 1 wherein the said fines and tail are separated from each other by wet gravity separation.

3. A method according to claim 1 wherein the said fines and tails are separated from each other by dry air classification.

4. The method of claim 1 wherein the size of essentially all of the particles in the tails is greater than 30 μm.

5. The method of claim 4 wherein the support is cordierite and the washcoat is alumina containing a platinum group metal.

6. The method of claim 1 wherein the tails are ground again to give more fines containing platinum group metal values.

* * * * *